Oct. 23, 1962 S. ROBINSON 3,059,540
REAR VIEW MIRROR FOR USE ON MOTOR VEHICLES
Filed Nov. 17, 1958 2 Sheets-Sheet 1

INVENTOR.
Sirman Robinson
BY
Fred C. Matheny
ATTORNEY

Oct. 23, 1962     S. ROBINSON     3,059,540
REAR VIEW MIRROR FOR USE ON MOTOR VEHICLES
Filed Nov. 17, 1958     2 Sheets-Sheet 2

INVENTOR.
Sirman Robinson
BY Fred C. Matheny
ATTORNEY

United States Patent Office 3,059,540
Patented Oct. 23, 1962

3,059,540
REAR VIEW MIRROR FOR USE ON MOTOR VEHICLES
Sirman Robinson, 2310 Mountain View, Tacoma, Wash.
Filed Nov. 17, 1958, Ser. No. 774,266
1 Claim. (Cl. 88—98)

My invention relates to a rear view mirror for use on motor vehicles and an object of my invention is to provide a rear view mirror which, at all times when the vehicle whereon the mirror is carried is moving, will be kept clear of all forms of moisture which tend to impair the reflecting qualities of the mirror.

Another object is to provide a rear view mirror having means whereby air through which the mirror is being moved by the travel of a vehicle whereon it is carried will be directed across the reflecting surface of the mirror in such a manner as to keep said reflecting surface free from moisture in the form of fog or vapor or drops or films of water which would tend to impair the reflecting qualities of the mirror.

Another object is to provide a rear view mirror for use on a motor vehicle, said mirror comprising a reflector member facing to the rear of the vehicle and having a marginal frame of channel or trough shape in cross section with its open side directed toward the front of the vehicle so that said frame forms an air trap to receive air when the vehicle is in motion, said channel shaped frame having in its inner wall numerous perforations which are approximately flush with the rear face of the reflector and are capable of directing air across the reflecting face of the mirror.

Another object is to provide a rear view mirror of this type in which a convex dome shaped air deflector is provided on the front side of the mirror to deflect air into the forwardly facing marginal channel of the mirror.

Another object is to provide a rear view mirror having a marginal frame of channel shaped cross section formed of thin material, said frame having an insert or filter member fitting against its inner wall streamlining the interior of said channel shaped frame and providing added thickness through which perforations extend at an incline and impart directional characteristics to air passing inwardly through said perforations.

Other objects of my invention are to provide a rear view mirror which is simple in construction, completely free from moving parts and electrically actuated devices and one that is not expensive to manufacture.

In this description the side of the mirror toward the rear of the vehicle is termed the rear side and the opposite side thereof is termed the front side.

In the drawings FIGURE 1 is an elevation showing the image reflecting side of a circular mirror constructed in accordance with my invention.

Like reference numerals refer to like parts throughout the several views.

Figure 1:
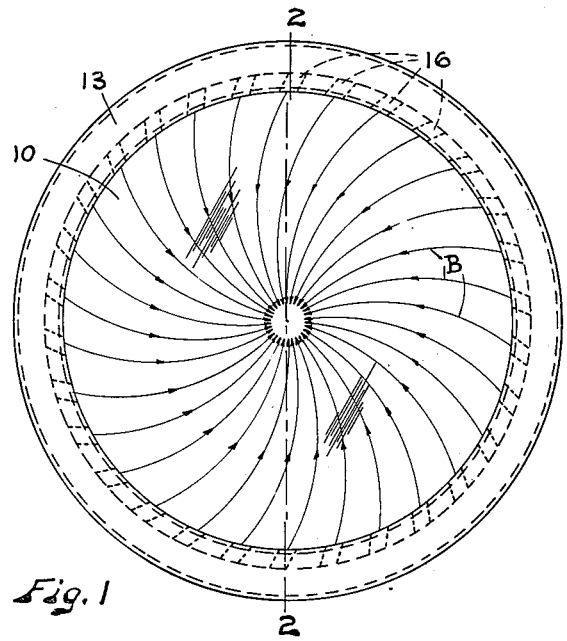
Figure 2:
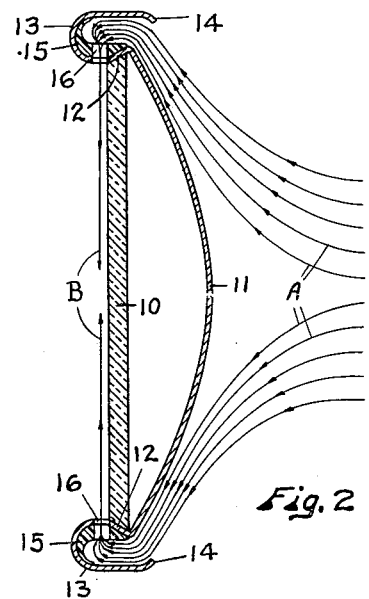
FIG. 2 is a view in diametrical section of the same taken substantially on broken line 2—2 of FIG. 1.
Figure 3:
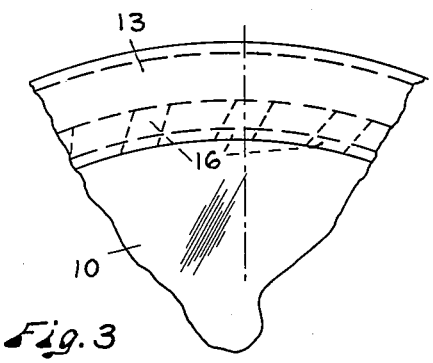
FIG. 3 is an enlarged fragmentary elevation of a marginal portion of this circular mirror.
Figure 4:
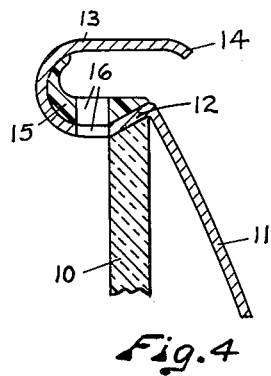
FIG. 4 is a fragmentary sectional view taken substantially on broken line 4—4 of FIG. 3.

The circular rear view mirror shown in FIGS. 1 to 4 comprises a circular reflector member 10 mounted within a suitable frame which may be varied in construction but is herein shown as comprising a forwardly convex spherical air deflector member 11 having its marginal portion bent to provide a rearwardly and inwardly extending conical mirror edge engaging part 12 and an outwardly and forwardly extending reversely curved U shaped air intercepting channel or trough 13. The outer wall of the channel 13 terminates in an inwardly inclined tip portion 14. Preferably a filler ring or insert, member 15 is provided within the U shaped channel part 13 in contact with the inner wall thereof. A plurality of spaced apart inclined air passageways 16 extend through the filler ring 15 and inner wall of the U shaped channel member 13 and are approximately flush with the rear face of the reflector member 10. The frame, composed of parts 11, 12 and 13 is preferably formed of fairly thin sheet material, such as sheet metal and the insert member 15 within the channel member 13 provides additional thickness through which the air passageways or perforations 16 extend in inclined directions. The filler ring 15 streamlines and evens up the inside of the channel 13 and provides additional thickness so that the air passageways 16 are long enough to impart directional characteristics to the jets or streams of air passing therethrough. Said air passageways 16 are all inclined in the same direction and are herein shown to be formed at an angle of above thirty degrees relative to radial lines common to the respective passageways and the center of the mirror. Obviously this angle may be varied.

When this rear view mirror is installed on a motor vehicle in the usual maner with the mirror 10 facing rearwardly and the convex air deflector 11 facing forwardly movement of the vehicle will cause air to continuously impinge against the forwardly facing deflector 11. This air will be deflected outwardly and caused to follow the general direction indicated by the arrows A and a substantial amount of it will enter into the U shaped channel 13. The outer wall of channel 13 with the inwardly inclined terminal part 14 overhangs and extends forwardly beyond the adjacent part of the air deflector 11 and helps to direct air into the channel 13. Air thus directed into the channel 13 will pass through the inclined air passageways 16 and sweep across the face of the reflector member 10. The inclined streams of air sweeping across the face of the reflector member 10 will be caused to spiral toward the center of the mirror, as indicated by the arrows B in FIG. 1, thereby converging the moisture toward the center of the mirror and blowing or driving most of this moisture off of the mirror. This air passing across the face of the reflector member or mirror 10 is further conducive to rapid evaporation of moisture thereon. Also this air tends to deflect mist and spray and prevent it from coming in contact with the surface of reflector 10. If the mirror is used when rain is falling water which is deflected into the channel 13 will be blown across the face of the mirror without seriously impairing its image reflecting characteristics.

FIGS. 5 to 8 inclusive disclose an adaptation of my invention to a rear view mirror of rectangular shape. Said FIGS. 5 to 8 show a reflector member 20 in a frame which comprises a front air deflector member 21 having its marginal portion shaped to provide a rearwardly and inwardly inclined part 22 which receives and mates with the beveled edge of the reflector member 20 and further having a reversely bent channel portion 23 of trough shaped cross section. The terminal part 24 of the outer wall of the channel member 23 extends forwardly beyond and overhangs the adjacent part of the deflector member 21 and is inwardly inclined to better catch and deflect air into said channel 23. The air deflecting front wall 21 is preferably shaped like a flattened pyramid with four plane surfaces sloping from a center toward the four edges of the mirror. A filler member 25, which provides additional thickness, is disposed within the channel 22 and inclined air passageways 26 extend through the filler member 25 and inner wall of the channel member 23 approximately flush with the rear surface of the reflector 20.

Figure 5:
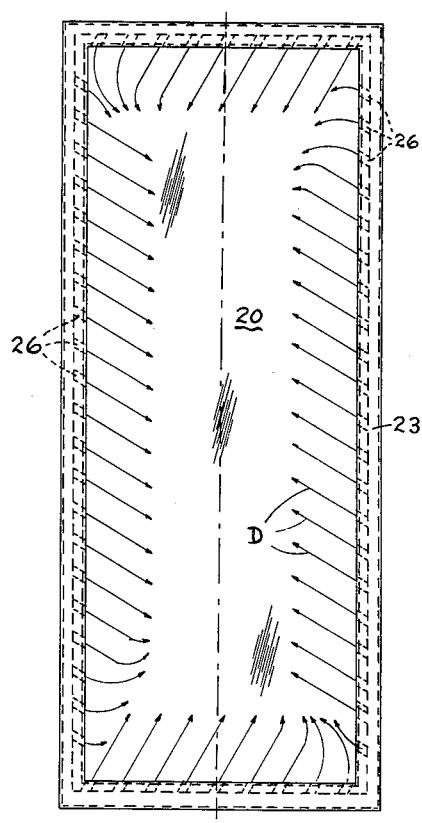
FIG. 5 is a rear elevation showing the image reflecting side of a rear view mirror of rectangular outline constructed in accordance with my invention.
Figure 6:
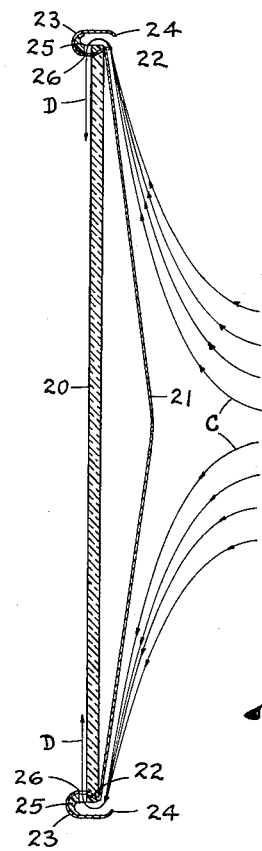
FIG. 6 is a sectional view taken substantially on broken line 6—6 of FIG. 5.
Figure 7:
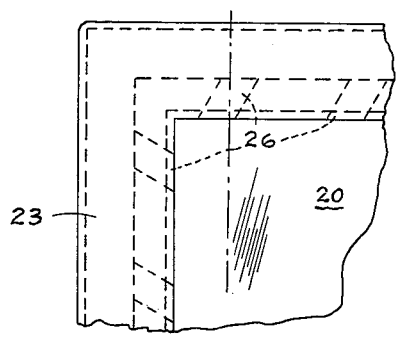
FIG. 7 is a fragmentary view in elevation, on a larger scale than FIGS. 5 and 6, of a corner portion of the mirror shown in said FIGS. 5 and 6.
Figure 8:
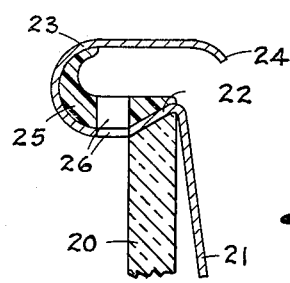
FIG. 8 is a fragmentary sectional view taken substantially on broken line 8—8 of FIG. 7.

The operation or functioning of the rectangular mirror shown in FIGS. 5 to 8 is similar to that of the previously described circular mirror in that the air deflector member 21 deflects the air outwardly, as indicated by arrows C in FIG. 6, into the channel 23 and this air is then directed through the air passageways 26 and angularly across the rear or image reflecting face of the reflector 20 as indicated by the arrows D in FIGS. 5 and 6.

The foregoing description and accompanying drawings clearly disclose preferred embodiments of my invention but it will be understood that this disclosure is merely illustrative and that changes may be made within the scope of the following claims.

I claim:

A rear view mirror for use on the exterior of a motor vehicle, comprising a rearwardly facing reflector having a beveled edge; a frame extending around said reflector and having a beveled portion receiving and fitting over the beveled edge of the reflector and having a reversely bent outwardly and forwardly extending part which cooperates in forming in said frame a forwardly facing air receiving trough shaped channel member extending around the margin of the reflector; a convex air deflector member marginally connected with said frame covering the front side of said reflector and capable of deflecting air into said trough shaped channel member; and a filler member in said channel member positioned against the inner wall of the channel member, said filler member and the inner wall of said channel member having spaced apart inclined air passageways of substantial length extending therethrough and distributed substantially all of the way around said channel member, said passageways being substantially flush with the rear face of asid reflector, whereby air entering said channel member will be directed across the rear face of said reflector.

References Cited in the file of this patent

UNITED STATES PATENTS

| 2,326,316 | Allen | Aug. 10, 1943 |
| 2,796,506 | Lumbert | June 18, 1957 |

FOREIGN PATENTS

| 1,028,898 | Germany | Apr. 24, 1958 |
| 1,035,499 | Germany | July 31, 1958 |